US008313837B2

(12) United States Patent
Stine et al.

(10) Patent No.: US 8,313,837 B2
(45) Date of Patent: Nov. 20, 2012

(54) WATER BORNE SOFT-FEEL COATING COMPOSITION

(75) Inventors: Christy Stine, Royal Oak, MI (US); Eric Orvis, Royal Oak, MI (US); Nadir Zia Yousif, Troy, MI (US); Donald Albert Paquet, Troy, MI (US); Kirk Martin Sample, Dearborn, MI (US); Alexander Leo Yahkind, West Bloomfield, MI (US)

(73) Assignee: Akzo Nobel Coatings International B.V., Arnhem (NL)

( * ) Notice: Subject to any disclaimer, the term of this patent is extended or adjusted under 35 U.S.C. 154(b) by 576 days.

(21) Appl. No.: 12/529,174

(22) PCT Filed: Feb. 29, 2008

(86) PCT No.: PCT/EP2008/052513
§ 371 (c)(1),
(2), (4) Date: Aug. 28, 2009

(87) PCT Pub. No.: WO2008/107396
PCT Pub. Date: Sep. 12, 2008

(65) Prior Publication Data
US 2010/0092766 A1    Apr. 15, 2010

Related U.S. Application Data

(60) Provisional application No. 60/904,514, filed on Mar. 2, 2007, provisional application No. 61/026,287, filed on Feb. 5, 2008.

(30) Foreign Application Priority Data

Apr. 17, 2007 (EP) ...................................... 07106329

(51) Int. Cl.
*B32B 27/40* (2006.01)
*C08L 75/04* (2006.01)
*B05D 3/00* (2006.01)

(52) U.S. Cl. ...................... 428/423.1; 428/336; 524/591; 427/385.5

(58) Field of Classification Search ................... 428/335, 428/336, 423.1; 524/591; 427/385.5
See application file for complete search history.

(56) References Cited

U.S. PATENT DOCUMENTS

| 5,552,496 | A  | * | 9/1996  | Vogt-Birnbrich et al. ................ 525/440.02 |
| 5,760,123 | A  | * | 6/1998  | Vogt-Birnbrich et al. .... 524/500 |
| 6,635,706 | B1 |   | 10/2003 | Petschke et al. |
| 2002/0165334 | A1 | | 11/2002 | Melchiors et al. |
| 2004/0242765 | A1 | | 12/2004 | Munzmay et al. |
| 2007/0055026 | A1 | | 3/2007  | Yahkind et al. |

FOREIGN PATENT DOCUMENTS

| DE | 41 20 323      | 12/1992 |
| EP | 0 511 457      | 11/1992 |
| EP | 0 760 249      | 3/1997  |
| EP | 0 790 263      | 8/1997  |
| WO | WO 96/10595    | 4/1996  |
| WO | WO 02/14395    | 2/2002  |
| WO | WO 03/068415   | 8/2003  |
| WO | WO 2007/028792 | 3/2007  |

OTHER PUBLICATIONS

International Search Report and Written Opinion, International PCT Application No. PCT/EP2008/052513, mailed Jun. 6, 2008.
International Preliminary Report on Patentability, International PCT Application No. PCT/EP2008/052513, mailed Jun. 10, 2009.

* cited by examiner

*Primary Examiner* — Thao T. Tran
(74) *Attorney, Agent, or Firm* — Kenyon & Kenyon

(57) ABSTRACT

The invention relates to a water borne coating composition comprising a polyurethane and a polyisocyanate, wherein the composition further comprises a compound having a molecular weight of at most 1,000 and having at least two isocyanate-reactive groups, with the proviso that said compound having a molecular weight of at most 1,000 and having at least two isocyanate-reactive groups is not a poly(ethylene glycol), and that the polyurethane differs from the material formed by reaction of the polyisocyanate and the compound having a molecular weight of at most 1,000 and having at least two isocyanate-reactive groups.

15 Claims, No Drawings

WATER BORNE SOFT-FEEL COATING COMPOSITION

REFERENCE TO RELATED APPLICATION(s)

This application is the U.S. National Phase of PCT/EP2008/052513 filed on Feb. 29, 2008 and claims the benefit of U.S. Provisional Application No. 60/904,514 filed on Mar. 2, 2007 and U.S. Provisional Application No. 61/026,287 filed on Feb. 5, 2008.

The invention relates to a water borne coating composition comprising a polyurethane and a polyisocyanate. The invention further relates to a kit of parts for preparation of the coating composition, to the use of the coating composition, to a process for applying a coating on a substrate, and to coated substrates.

A water borne coating composition of the above-mentioned type is known from United States patent application US 2004/0242765 A. This document describes aqueous polyurethane dispersions for producing coatings with a soft-feel effect. The aqueous coating composition comprises an aqueous formulation of a hydroxyl-containing polyurethane and a crosslinker. The crosslinker preferably is a polyisocyanate having free isocyanate groups.

In modern automobile interiors, soft-feel coatings are used to coat plastic parts such as instrument panels, door panels, arm rests, head rests, airbag covers, glove compartment covers, and center consoles. The soft-feel coatings are applied to convey a feeling of smoothness and luxury similar to that provided by leather or velvet. It is desirable that the soft-feel coatings, next to providing the required haptic perception, also have good chemical and mechanical resistance, such as suntan lotion resistance, hydrolysis resistance, and heat aging resistance. Improvement of the chemical and mechanical resistance of soft-feel coatings, at a given layer thickness, can be achieved by increasing the crosslink density and/or hardness of the coatings, e.g. by using a higher proportion of crosslinker and/or by employing binders having a higher hardness and/or a higher proportion of crosslinkable functional groups. However, it has been found that improvement of the chemical and mechanical resistance by taking such measures is accompanied by a deterioration of the soft-feel properties. Thus, a very good balance of the desired haptic properties and the chemical and mechanical resistance cannot be achieved with the known soft-feel coating compositions.

Accordingly, the invention seeks to provide a water borne coating composition from which soft-feel coatings can be produced, which coatings have an improved balance of chemical and mechanical resistance and soft-feel properties.

The invention now provides a water borne coating composition comprising a polyurethane and a polyisocyanate, wherein the composition further comprises a compound, other than poly(ethylene glycol), having a molecular weight of at most 1,000 and having at least two isocyanate-reactive groups.

With the coating composition according to the invention it is possible to produce soft-feel coatings having an improved balance of chemical and mechanical resistance and soft-feel properties.

It has been found that this improvement is not or not sufficiently obtained when the compound having a molecular weight of at most 1,000 and having at least two isocyanate-reactive groups is a poly(ethylene glycol).

However, it is to be understood that poly(ethylene glycol) may nevertheless be additionally present in the composition, as long as at least one compound other than poly(ethylene glycol), having a molecular weight of at most 1,000 and having at least two isocyanate-reactive groups, is used.

Suitable polyurethanes can be prepared according to generally known methods by reacting an aliphatic, alicyclic or aromatic di- or triisocyanate, one or more polyalcohols containing 2 to 6 hydroxyl groups and having a number average molecular weight up to 600, and/or a polyether or polyester diol having a number average molecular weight between about 400 and about 3,000. It is to be understood that the polyurethane present in the coating composition differs from the material formed by reaction of the polyisocyanate and the isocyanate-reactive compound having a molecular weight of at most 1,000 present in the coating composition.

In one embodiment, the at least one polyurethane present in the coating composition comprises hydroxyl groups. In order to achieve hydroxyl functionality in the resulting polyurethanes, a stoichiometric excess of the hydroxyl component can be used during polyurethane synthesis. If prepared in a two-step process, hydroxyl-functional chain extenders may be used. The hydroxyl-functional polyurethane may be present in the form of an aqueous polyurethane dispersion.

Carboxylic acid groups can be introduced into the polyurethanes by the co-reaction of hydroxycarboxylic acids. Dimethylol propionic acid, hydroxypivalic acid, and hydroxystearic acid are examples of suitable hydroxycarboxylic acids.

Sulphonate groups or sulphonic acid groups can be introduced into a polyurethane, for example by co-reaction with isocyanates and with hydroxyl- or amine-functional compounds comprising at least one sulphonic acid group or sulphonate group, for example, 2-hydroxyethane sulphonic acid, the sodium salt of 2-aminoethane sulphonic acid, 3-cyclohexylamino-1-propane sulphonic acid, the reaction product of sodium 5-sulphoisophthalate with an equivalent excess of diols, triols or epoxy compounds. In one embodiment of the coating composition according to the invention, more than 50% of the sulphonic acid groups and carboxylic acid groups of the polyurethane are neutralized with a base. The polyurethane may also comprise non-ionic stabilizing groups. Alternatively or additionally, the polyurethane can be stabilized in an aqueous medium by external emulsifiers.

The polyurethanes can contain organic solvents for reduction of the viscosity. Suitable solvents are aromatic hydrocarbons such as toluene and xylene; alcohols such as ethanol, isopropanol, n-butanol, 2-butanol, hexanol, benzyl alcohol, and ketones such as methylethyl ketone, methylisobutyl ketone, methylamyl ketone, and ethylamyl ketone; esters such as butyl acetate, butyl propionate, ethoxyethyl propionate, ethylglycol acetate, butylglycol acetate, and methoxypropyl acetate; ethers such as diethylene glycol dimethyl ether, dipropylene glycol dimethyl ether, 2-methoxypropanol, 2-methoxybutanol, ethylene glycol monobutyl ether, propylene glycol monopropyl ether, propylene glycol monobutyl ether, dioxolane or mixtures thereof. Other suitable solvents are N-methyl-2-pyrrolidone, dimethyl carbonate, propylene carbonate, butyrolactone, caprolactone, etc.

Mixing the polyurethane with an aqueous medium can be done conveniently by adding water to the polyurethane solution or, alternatively, by adding the polyurethane solution to water, under agitation. If desired, the organic solvent content of the resulting polyurethane emulsion or dispersion may be reduced by distillation, optionally under reduced pressure. The coating composition generally contains at least 8% by weight of at least one polyurethane, calculated on the non-volatile content of the composition. In another embodiment, the amount of polyurethane is at least 12% by weight, or at least 20% by weight. Generally, the amount of polyurethane does not exceed 70% by weight, calculated on the non-volatile content of the composition. In another embodiment, the amount of polyurethane is at most 60% by weight, or at most 50% by weight.

In one embodiment, the coating composition of the invention comprises at least two different polyurethanes. One of the polyurethanes may be essentially free of hydroxyl groups, whereas the other polyurethane may comprise a plurality of hydroxyl groups. In that case, the weight ratio of hydroxyl-free polyurethane to hydroxyl-functional polyurethane suitably is in the range of 95:5 to 60:40, based on non-volatile matter. The polyurethanes generally are present in the coating composition in the form of dispersed particles, i.e. polyurethane dispersions. Suitable polyurethanes are also commercially available in the form of aqueous dispersions, for example under the trade designation Bayhydrol® ex Bayer. Bayhydrol® PT 241 may be mentioned as a specific example of a suitable hydroxyl-functional polyurethane dispersion, Bayhydrol® PR 340 is an example of a non-functional polyurethane dispersion.

Suitable polyisocyanate crosslinkers for use in the coating composition of the invention include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl)methane, 1,4-diisocyanatobutane, 1,5-diisocyanato-2,2-dimethyl pentane, 1,10-diisocyanatodecane, 1,4-diisocyanato-cyclohexane, 2,4-hexahydrotoluene diisocyanate, 2,6-hexahydrotoluene diisocyanate, norbornane diisocyanate, 1,3-xylene diisocyanate, 1,4-xylene diisocyanate, 1-isocyanato-3-(isocyanatomethyl)-1-methylcyclohexane, m-α,α,α',α'-tetramethyl xylene diisocyanate.

Also suitable as isocyanate curing agents are triisocyanates, for example, 1,8-diisocyanato-4-(isocyanatomethyl)octane, lysine triisocyanate, and adducts and oligomers of polyisocyanates, for instance, biurets, isocyanurates, allophanates, imino-oxadiazinediones, uretdiones, urethanes, and mixtures thereof. Examples of such oligomers and adducts are the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the allophanate-modified trimer or higher oligomers of 1,6-diisocyanatohexane, the adduct of 3 moles of m-α,α,α',α'-tetramethyl xylene diisocyanate to 1 mole of trimethylol propane, and mixtures thereof.

The polyisocyanate crosslinker may comprise hydrophilic groups, for example, covalently bonded hydrophilic polyether moieties. Such polyisocyanates can be stirred in more easily by hand than hydrophobic polyisocyanates.

Suitable polyether compounds for the modification of polyisocyanates are mono- and dihydric polyalkylene oxide polyether alcohols containing a statistical average of 3 to 35 ethylene oxide units. The hydrophilic polyisocyanates generally have an isocyanate functionality of 1.5 to 5 and a content of ethylene oxide units within the bound polyether chains of about 2 to 20% by weight. Examples of hydrophilic polyisocyanates are the reaction products of the isocyanurate trimers of 1,6-diisocyanatohexane and/or the isocyanurate trimers of isophorone diisocyanate and a methyl ether of poly(ethylene glycol); the reaction product of the adduct of m-α,α,α',α'-tetramethyl xylene diisocyanate (3 moles) to trimethylol propane (1 mole) and a methyl ether of poly. Alternatively, the polyisocyanate can be rendered hydrophilic by reaction with isocyanate-reactive compounds containing ionic groups, for example, the alkali metal salts of sulphonic acids containing at least one hydroxyl group or one isocyanate-reactive amine group.

Another class of suitable polyisocyanate crosslinkers are polyisocyanates which contain external emulsifiers to facilitate their dissipation in water borne systems. Such polyisocyanate crosslinkers are commercially available from Rhodia.

The amount of polyisocyanate in the coating composition generally is at least 5% by weight, based on the non-volatile content of the composition. In another embodiment, the amount of polyisocyanate is at least 10% by weight, or at least 15% by weight. The amount of polyisocyanate suitable is at most 30% by weight, or at most 25% by weight, or at most 20% by weight, all based on the non-volatile content of the composition.

As mentioned above, the coating composition of the invention comprises a compound having a molecular weight of at most 1,000 and having at least two isocyanate-reactive groups, with the proviso that said compound is not a poly (ethylene glycol).

In one embodiment, this compound has a molecular weight of at most 500. The at least two isocyanate-reactive groups may be independently selected from secondary amino groups, thiol groups, or hydroxyl groups, or mixtures thereof. Hydroxyl groups are generally preferred. Examples of suitable compounds are water-soluble di- or polyhydric alcohols. Examples of polyhydric alcohols include propylene glycol, isomeric butane diols, the polypropylene oxide glycols, tris (2-hydroxyethyl)isocyanurate, 1,1,1-trimethylol propane, 1,2,3-trimethylol propane, pentaerythritol, glycerol, and mixtures thereof. It is also possible to use polyols based on renewable resources. Examples thereof are carbohydrate-derived polyols, such as isosorbide, 1,4-anhydroerythritol, 1,2: 5,5-dianhydro-sorbitol, and isomannide. An example of a dimer fatty acid based diol is Pripol 2033 ex Uniqema. Other examples of suitable compounds are esters and urethanes having at least two isocyanate-reactive groups, provided that the molecular weight is below 1,000. If the esters or urethanes have a molecular weight distribution, the number average molecular weight should not exceed 1,000. Suitable urethane diols are available commercially under the trade designation K-FLEX® from King Industries.

The compound having a molecular weight of at most 1,000 and having at least two isocyanate-reactive groups may be liquid or a solid compound. In addition to improving the balance of chemical and mechanical resistance and soft-feel properties of the coatings produced, this compound also reduces the requirement to include organic co-solvents in the aqueous coating composition as coalescing agents and film-forming aids.

Said compound having a molecular weight of at most 1,000 and having at least two isocyanate-reactive groups is generally used in an amount of 0.1 to 20% by weight, calculated on the non-volatile content of the coating composition. In other embodiments, the amount of said compound is at least 1%, or at least 3.8%, based on the non-volatile content of the coating composition. In one embodiment, said compound having a molecular weight of at most 1,000 and having at least two isocyanate-reactive groups provides at least 25 mol-%, or at least 50 mol-%, or at least 66 mol-%, or at least 75 mol-%, based on the total molar amount of isocyanate-reactive groups present in the coating composition. For the purpose of this calculation, water present in the coating composition is not taken into consideration as isocyanate-reactive group.

In one embodiment, the coating composition according to the invention can be applied as a clear coat. In this case, the composition is essentially free of pigments. Alternatively, the composition can comprise pigments and/or colouring agents to provide colour and hiding power. The coating composition according to the invention can further comprise other components and additives conventionally present in coating compositions, such as extenders, pigment dispersants, emulsifiers (surfactants), rheology-controlling agents, levelling agents, flatting agents, coalescents, wetting agents, anti-cratering agents, anti-foaming agents, biocides, plasticizers, UV absorbers, light stabilizers, and odour masking agents.

In one embodiment the coating composition of the invention also comprises a curing catalyst for the reaction of isocyanate groups and hydroxyl groups. Examples of curing catalysts are metal based curing catalysts and basic catalysts. Suitable metals include zinc, cobalt, manganese, zirconium, bismuth, and tin. It is preferred that the coating composition comprises a tin based catalyst. Well-known examples of tin based catalysts are dimethyl tin dilaurate, dimethyl tin diversatate, dimethyl tin dioleate, dibutyl tin dilaurate, dioctyl tin dilaurate, and tin octoate. As an example of a basic catalyst diaza-bicyclo[2.2.2]octane may be mentioned.

The coating composition of the invention can further comprise one or more other well-known coating resins, for example, epoxy resins, acrylic resins, for example in the form of acrylic latexes, phenolic resins, cellulose nitrate, polyvinyl butyral resins, etc. If so desired, the other coating resins may be functionalized with hydroxyl-reactive groups selected from the group of isocyanate, epoxy, acetal, carboxyl, anhydride, and alkoxy silane groups. Also, mixtures of these groups in one compound are included. The coating composition can also comprise an amino resin. In one embodiment, the coating composition of the invention does not contain a melamine polyol. In an alternative embodiment, the coating composition also comprises a melamine polyol. Examples of suitable melamine polyols and their preparation are described in International patent application WO 2007/028792 A.

Depending on the presence of additional functional groups, the coating composition can further comprise other known curing catalysts, for example, tertiary amines or sulphonic acids, such as p-toluene sulphonic acid and dodecyl benzene sulphonic acid.

The major part of the volatile content of the coating composition of the present invention consists of water. However, the coating composition can contain one or more organic solvents, with the proviso that the volatile organic content (VOC) of the ready-for-use coating composition does not exceed 540 g/l; preferably, it does not exceed 420 g/l. As suitable organic solvents may be mentioned diethylene glycol dimethyl ether, dipropylene glycol dimethyl ether, methyl ether of diacetone alcohol, ethyl acetate, butyl acetate, ethyl glycol acetate, butyl glycol acetate, 1-methoxy-2-propyl acetate, butyl propionate, ethoxy ethyl propionate, toluene, xylene, methylethyl ketone, methyl isobutyl ketone, methyl isoamyl ketone, ethyl amyl ketone, dioxolane, N-methyl-2-pyrrolidone, dimethyl carbonate, propylene carbonate, butyrolactone, caprolactone, and mixtures thereof.

As is usual with coating compositions comprising a hydroxy-functional binder and an isocyanate-functional crosslinker, the composition according to the invention has a limited pot life. In particular, the polyisocyanate has a limited stability in an aqueous environment. Therefore, the composition is suitably provided as a multi-component composition, for example as a two-component composition or as a three-component composition. Therefore, the invention also relates to a kit of parts for preparation of the coating composition comprising a) a water borne binder module comprising a polyurethane dispersion and a compound having a molecular weight of at most 1,000 and having at least two isocyanate-reactive groups, with the proviso that said compound having a molecular weight of at most 1,000 and having at least two isocyanate-reactive groups is not a poly(ethylene glycol), and b) a non-aqueous crosslinker module comprising a polyisocyanate.

The coating composition of the invention can be prepared by mixing the components of the kit of parts.

The kit of parts suitably comprises metering aids to facilitate mixing of the components in the required ratios. In one embodiment, the modules of the kit of parts comprise the components in the required ratios, i.e. the modules are provided in a plurality of containers which contain the components in the required amounts to form the coating composition of the invention.

Alternatively, the amount of the components may be provided in ratios deviating from the required ratios for the coating composition and additionally a metering aid is provided, such as a mixing container having visible indications for the required volumes of the modules to form the coating composition of the invention. The required volumes may also be indicated on a so-called metering stick, which is common in the paint industry. Variations and combinations of suitable metering aids will be readily appreciated by a skilled person.

Application of the coating composition onto a substrate can be via any method known to the skilled person, e.g., via rolling, spraying, brushing, flow coating, dipping, and roller coating. Preferably, a coating composition such as described is applied by spraying. In one embodiment, the water borne binder module and the non-aqueous crosslinker module comprising a polyisocyanate are mixed in a separate container to form the coating composition of the invention, prior to application to a substrate. Alternatively, it is also possible to feed the modules to a two- or plural-component spray gun separately. In this case mixing of the components takes place in the spray gun.

For preparation of a coating, the coating composition of the invention can be applied to any substrate. The substrate may be, for example, metal, e.g., iron, steel, and aluminium, plastic, wood, glass, synthetic polymer, paper, leather, or another coating layer. In particular, the coating compositions of the current invention can be used for the preparation of soft-feel coatings, for example as soft-feel coatings of interior synthetic polymer parts of a motor vehicle, such as instrument panels, door panels, arm rests, head rests, airbag covers, glove compartment covers, and center consoles. In order to obtain sufficient chemical resistance, a dry film layer thickness of more than 40 µm, for example 50 µm or more, is required for conventional soft-feel coatings. At lower dry film layer thickness the resistance properties of the known coatings are insufficient. With the coating composition according to the invention, it is possible to produce soft-feel coatings having sufficient chemical resistance at lower dry film layer thickness, for example 20 to 40 µm, more in particular 25 to 37 µm.

The coating compositions are also suitable for coating objects such as bridges, pipelines, industrial plants or buildings, oil and gas installations, or ships.

The applied coating composition can be cured very effectively at a temperature of, e.g., 0-60° C. If so desired, the coating composition may be oven cured, e.g. at a temperature in the range of 60-120° C. Alternatively, curing can be supported by (near) infrared radiation. Before curing at elevated temperature the applied coating composition may optionally be subjected to a flash-off phase.

It is to be understood that the term coating composition as used herein also includes its use as an adhesive composition.

EXAMPLES

Raw Materials Used:

| | |
|---|---|
| K Flex ® UD-320W | Water reducible urethane diol ex King Industries |
| Bayhydrol ® PT 241 | Aqueous dispersion of a hydroxyl-functional polyurethane ex Bayer |
| Bayhydrol ® PR 340 | Aqueous dispersion of a non-functional polyurethane ex Bayer |
| Bayhydur ® LS2306 | Hydrophilically modified polyisocyanate ex Bayer |
| Surfynol ® DF62 | Defoamer ex Air Products |
| Carbowax 400 ™ | Poly(ethylene glycol) of molecular weight 400 ex Union Carbide/Dow |

General Methods:

The Brookfield viscosity was measured at 25° C., spindle #4, at 20 RPM.

The film thickness was measured with a Fisher permascope.

Coating Composition Example 1

Coating composition 1 according to the invention was prepared as described below. The amounts of the components are given in parts by weight (pbw).

The following components were combined with stirring:

| Component | Amount (pbw) |
|---|---|
| Bayhydrol ® PT 241 | 3.22 |
| Bayhydrol ® PR 340 | 35.86 |
| Water | 17.92 |
| Surfynol ® DF-62 | 0.38 |
| Isosorbide | 1.34 |

The following components were sifted in under agitation and mixed for 30 minutes:

| Component | Amount (pbw) |
|---|---|
| Micronized silica | 3.49 |
| Pentaerythritol | 0.20 |

The following components were premixed and added to the vessel with stirring:

| Component | Amount (pbw) |
|---|---|
| Diethylene glycol dimethyl ether | 2.98 |
| Polydimethyl siloxane | 0.27 |
| Polyether-modified polysiloxane | 0.27 |
| Polyether-modified siloxane | 0.31 |
| Hindered amine light stabilizer | 0.72 |
| UV absorber | 0.38 |
| Dibutyl tin dilaurate | 0.01 |

Subsequently, the following was added:

| Component | Amount (pbw) |
|---|---|
| \Aqueous 10% Bentone HD | 1.20 |

Immediately prior to application, the following components were added:

| Component | Amount (pbw) |
|---|---|
| Ethylene glycol monobutyl ether acetate | 15.72 |
| Bayhydur ® LS2306 | 15.72 |

Coating Composition Example 2

Coating composition 2 according to the invention was prepared as described below. The amounts of the components are given in parts by weight (pbw).

The following components were combined with stirring:

| Component | Amount (pbw) |
|---|---|
| Bayhydrol ® PT 241 | 3.47 |
| Bayhydrol ® PR 340 | 38.64 |
| Water | 19.31 |
| Surfynol ® DF-62 | 0.41 |
| 2-Butyl-2-ethyl-1,3-propane diol - BEPD | 1.01 |

The following components were sifted in under agitation and mixed for 30 minutes:

| Component | Amount (pbw) |
|---|---|
| \Micronized silica | 4.01 |
| Pentaerythritol | 0.21 |

The following components were premixed and added to the vessel with stirring:

| Component | Amount (pbw) |
|---|---|
| Diethylene glycol dimethyl ether | 3.21 |
| Polydimethyl siloxane | 0.30 |
| Polyether-modified polysiloxane | 0.30 |
| Polyether-modified siloxane | 0.33 |
| Hindered amine light stabilizer | 0.77 |
| UV absorber | 0.41 |
| Dibutyl tin dilaurate | 0.02 |

Subsequently, the following was added:

| Component | Amount (pbw) |
|---|---|
| Aqueous 10% Bentone HD | 1.30 |

Immediately prior to application, the following components were added:

| Component | Amount (pbw) |
| --- | --- |
| Ethylene glycol monobutyl ether acetate | 13.15 |
| Bayhydur ® LS2306 | 13.15 |

Coating Composition Example 3

Coating composition 3 according to the invention was prepared as described below. The amounts of the components are given in parts by weight (pbw).
The following components were combined with stirring:

| Component | Amount (pbw) |
| --- | --- |
| Bayhydrol ® PT 241 | 3.26 |
| Bayhydrol ® PR 340 | 36.27 |
| Water | 18.12 |
| Surfynol ® DF-62 | 0.38 |
| K Flex UD-320W (water reducible urethane diol) | 3.01 |

The following components were sifted in under agitation and mixed for 30 minutes:

| Component | Amount (pbw) |
| --- | --- |
| Micronized silica | 3.77 |
| Pentaerythritol | 0.20 |

The following components were premixed and added to the vessel with stirring:

| Component | Amount (pbw) |
| --- | --- |
| Diethylene glycol dimethyl ether | 3.01 |
| Polydimethyl siloxane | 0.28 |
| Polyether-modified polysiloxane | 0.28 |
| Polyether-modified siloxane | 0.31 |
| Hindered amine light stabilizer | 0.72 |
| UV absorber | 0.38 |
| Dibutyl tin dilaurate | 0.02 |

Subsequently, the following was added:

| Component | Amount (pbw) |
| --- | --- |
| Aqueous 10% Bentone HD | 1.22 |

Immediately prior to application, the following components were added:

| Component | Amount (pbw) |
| --- | --- |
| Ethylene glycol monobutyl ether acetate | 14.38 |
| Bayhydur ® LS2306 | 14.38 |

Comparative Coating Composition A

Comparative coating composition A was prepared as described below. The amounts of the components are given in parts by weight (pbw).
The following components were combined with stirring:

| Component | Amount (pbw) |
| --- | --- |
| Bayhydrol ® PT 241 | 6.39 |
| Bayhydrol ® PR 340 | 67.70 |
| Water | 9.47 |

The following component was sifted in under agitation and mixed for 30 minutes:

| Component | Amount (pbw) |
| --- | --- |
| Micronized silica | 4.03 |

The following components were premixed and added to the vessel with stirring:

| Component | Amount (pbw) |
| --- | --- |
| Diethylene glycol dimethyl ether | 5.65 |
| Polydimethyl siloxane | 0.51 |
| Polyether-modified polysiloxane | 0.51 |
| Polyether-modified siloxane | 0.55 |
| Dibutyl tin dilaurate | 0.04 |

Immediately prior to application, the following components were added:

| Component | Amount (pbw) |
| --- | --- |
| Ethylene glycol monobutyl ether acetate | 2.57 |
| Bayhydur ® LS2306 | 2.57 |

Comparative Coating Composition B

Comparative coating composition B was prepared as described below. The amounts of the components are given in parts by weight (pbw).
The following components were combined with stirring:

| Component | Amount (pbw) |
| --- | --- |
| Bayhydrol ® PT 241 | 4.82 |
| Bayhydrol ® PR 340 | 51.02 |
| Carbowax 400 ™ | 4.53 |
| Water | 7.13 |

The following component was sifted in under agitation and mixed for 30 minutes:

| Component | Amount (pbw) |
| --- | --- |
| Micronized silica | 3.03 |

The following components were premixed and added to the vessel with stirring:

| Component | Amount (pbw) |
| --- | --- |
| Diethylene glycol dimethyl ether | 4.25 |
| Polydimethyl siloxane | 0.38 |
| Polyether-modified polysiloxane | 0.38 |
| Polyether-modified siloxane | 0.42 |
| Dibutyl tin dilaurate | 0.03 |

Immediately prior to application, the following components were added:

| Component | Amount (pbw) |
| --- | --- |
| Ethylene glycol monobutyl ether acetate | 12.00 |
| Bayhydur ® LS2306 | 12.00 |

Coating compositions 1, 2, 3, A and B were spray-applied to panels of automotive interior grade plastic. After application, the panels were allowed to flash off at room temperature for 5 minutes. Subsequently, the coated panels were oven cured for 20 minutes at 82° C. The dry film thickness was 25 to 32 µm.

The resistance of the coatings to suntan lotion was tested as follows:
1. A double layer of crock cloth was placed over a test panel, corner to corner.
2. A 0.24-0.25 g amount of suntan lotion was placed on top of the crock cloth and spread to a 1.27 cm diameter circle.
3. A clean 5 cm×5 cm piece of aluminium was placed on top of the suntan lotion (corner to corner with the crock cloth).
4. The panel with the sunscreen testing equipment was placed in a 74° C. oven with a 500 g brass weight placed directly on top of the aluminium.
5. After one hour, the panel was removed from the oven and dismantled in reverse order.
6. After 10 minutes at room temperature, the excess suntan lotion was removed with gentle wiping using a damp cloth.
7. After an additional 5 minutes at room temperature, the panel was tested with the Rockwell five-finger machine at various levels of force (Newtons) until the failure and pass points were determined. This test determines the degree of film degradation based on dragging a 1 mm round steel tip across the exposed area. The force at which loss of adhesion occurs is recorded. Higher values indicate less degradation of the film.

The visual rating scale is as follows:
Visual Ratings (Appearance)
1=Pass, no visual effect
2=Pass, slight colour change, slight cloth impression or blistering
3=Fail, noticeable colour change, noticeable cloth impression or paint blistered, wrinkled or cracked
4=Fail, severe colour change, cloth impression or paint blistered, wrinkled or cracked.

The soft-feel properties were determined by the dried coating layers being touched by hand by a plurality of persons. The following levels of properties were distinguished: hard/dry, hard/silky, soft/rubbery, and soft silky. The soft-feel rating shown in the Table below is the average rating given:

The Table below summarizes the results of the suntan lotion resistance tests:

| Coating composition | Visual rating | 5-Finger Adhesion | Soft feel |
| --- | --- | --- | --- |
| Example 1 | 2, pass | 8-10 N | Soft/silky |
| Example 2 | 2, pass | 10-14 N | Soft/silky |
| Example 3 | 2, pass | 8-13 N | Soft/silky |
| Comparative Ex. A | 3, fail | <5 N | Soft/silky |
| Comparative Ex. B | 2, pass | <8.0 N | Soft/silky |

Additionally, the coatings prepared from the composition according to the invention also had very good mar resistance and scratch resistance. From the results it can be inferred that the coatings prepared from the compositions according to the present invention exhibit, at the same layer thickness, a better suntan lotion resistance than the comparative coatings. Improvement of the suntan lotion resistance was achieved without deterioration of the soft-feel properties. It is demonstrated that the coatings prepared from the composition according to the invention have an improved balance of chemical and mechanical resistance and soft-feel properties.

The invention claimed is:

1. A water borne coating composition comprising
   a) at least one polyurethane comprising hydroxyl groups, wherein the polyurethane is present in the form of dispersed particles, and
   b) a polyisocyanate, wherein the composition further comprises
   c) a compound, other than poly(ethylene glycol), having a molecular weight of at most 1,000 and having at least two isocyanate-reactive groups,
   wherein the polyurethane differs from the material formed by reaction of the polyisocyanate and the compound having a molecular weight of at most 1,000 and having at least two isocyanate-reactive groups.

2. The water borne coating composition according to claim 1 wherein at least one of said at least two isocyanate-reactive groups is a hydroxyl group.

3. The water borne coating composition according to claim 1 wherein the compound having at least two isocyanate-reactive group has a molecular weight of at most 500.

4. The water borne coating composition according to claim 1 wherein the composition comprises at least two different polyurethanes.

5. The water borne coating composition according to claim 4 wherein the at least one other polyurethane is essentially free of hydroxyl groups.

6. The water borne coating composition according to claim 1 wherein the composition additionally comprises a melamine polyol.

7. The water borne coating composition according to claim 6 wherein the melamine polyol comprises hydrophilic stabilizing moieties.

8. A substrate coated with a soft-feel coating, wherein the soft-feel coating is prepared from a coating composition according to claim 1.

9. The substrate according to claim 8, wherein the dry film layer thickness of the soft-feel coating is in the range of 25 to 37 µm.

10. A kit of parts for preparation of the water borne coating composition according to claim 1, comprising
   a) a water borne binder module comprising a polyurethane dispersion and a compound having a molecular weight of at most 1,000 and having at least two isocyanate-reactive groups, wherein said compound having a molecular weight of at most 1,000 and having at least two isocyanate-reactive groups is not a poly(ethylene glycol), and b) a non-aqueous crosslinker module comprising a polyisocyanate.

11. A method for preparation of a soft-feel coating comprising applying to a substrate a water borne coating composition comprising:
a) at least one polyurethane comprising hydroxyl groups, wherein the polyurethane is present in the form of dispersed particles, and
b) a polyisocyanate, wherein the composition further comprises
c) a compound, other than polyethylene glycol), having a molecular weight of at most 1,000 and having at least two isocyanate-reactive groups, wherein the polyurethane differs from the material formed by reaction of the polyisocyanate and the compound having a molecular weight of at most 1,000 and having at least two isocyanate-reactive groups.

12. The process according to claim 11 wherein the substrate consists of a synthetic polymer.

13. The process according to claim 12 wherein the substrate is a motor vehicle interior part.

14. The process according to claim 11 wherein the process additionally comprises the step of curing the applied coating composition.

15. The process according to claim 11 wherein the dry film layer thickness of the prepared coating is in the range of 25 to 37 μm.

* * * * *